United States Patent
Herweg et al.

(10) Patent No.: US 6,279,538 B1
(45) Date of Patent: Aug. 28, 2001

(54) METHOD FOR EVALUATING AN ION CURRENT SIGNAL OF A SELF-IGNITING INTERNAL COMBUSTION ENGINE

(75) Inventors: Ruediger Herweg; Katsuyoshi Koyanagi, both of Esslingen; Rudolf Maly, Sindelfingen; Gerhard Muenkel, Fellbach; Gregor Renner, Stuttgart; Hartung Wilstermann, Gaildorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/382,189

(22) Filed: Aug. 23, 1999

(30) Foreign Application Priority Data

Aug. 22, 1998 (DE) .............................. 198 38 222

(51) Int. Cl.$^7$ ................. F02P 5/00; F02P 17/12
(52) U.S. Cl. ...................... 123/435; 123/406.26
(58) Field of Search .................. 123/435, 436, 123/406.26, 406.37, 406.27, 478

(56) References Cited

U.S. PATENT DOCUMENTS

| | | | | |
|---|---|---|---|---|
| Re. 32,301 | * | 12/1986 | Latsch et al. ........................ | 123/703 |
| 3,575,146 | * | 4/1971 | Creighton et al. .................... | 123/299 |
| 4,372,270 | * | 2/1983 | Latsch et al. ........................ | 123/703 |
| 4,377,140 | | 3/1983 | Latsch .............................. | 123/406.26 |
| 4,380,986 | | 4/1983 | Latsch et al. ........................ | 123/489 |
| 4,463,729 | | 8/1984 | Bullis et al. ......................... | 123/478 |
| 4,739,731 | * | 4/1988 | Habich et al. ....................... | 123/494 |
| 4,760,830 | * | 8/1988 | Bullis et al. ......................... | 123/501 |
| 5,425,339 | * | 6/1995 | Fukui ................................. | 123/435 |
| 5,769,049 | | 6/1998 | Nytomt et al. ....................... | 123/435 |
| 5,983,862 | * | 11/1999 | Nishiyama et al. ............ | 123/406.26 |

FOREIGN PATENT DOCUMENTS

| | | |
|---|---|---|
| 34 28 371 | 2/1986 | (DE) . |
| 44 10 063 | 9/1994 | (DE) . |
| 196 42 654 | 4/1998 | (DE) . |
| 0 190 206 | 8/1986 | (EP) . |
| 0 810 368 | 3/1997 | (EP) . |
| 0 864 738 | 9/1998 | (EP) . |
| 59043934 | * 3/1984 | (JP) . |
| 11082149 | * 3/1999 | (JP) . |
| WO 86/00961 | 2/1986 | (WO) . |

* cited by examiner

*Primary Examiner*—John Kwon
*Assistant Examiner*—Hieu T. Vo
(74) *Attorney, Agent, or Firm*—Crowell & Moring LLP

(57) ABSTRACT

A method for evaluating an ion current signal of a self-igniting internal combustion engine, with the ignition shift being derived from the time shift of the local maximum in the curve of the ion current signal relative to an injection point in time. Similarly, continuous injection in a cylinder can be detected when the ion current signal is integrated and evaluated in terms of area and/or when the position and/or height of the maximum of the ion current signal are evaluated. Carbon formation can be detected by an evaluation of the time curve of the ion current signal following an injection. For example, the parameters of the main injection can be controlled as a function of an evaluation of the measured ion current following a preinjection. When a continuous injection is detected, injection can be suppressed at least in those cylinders in which continuous injection was detected.

10 Claims, 3 Drawing Sheets

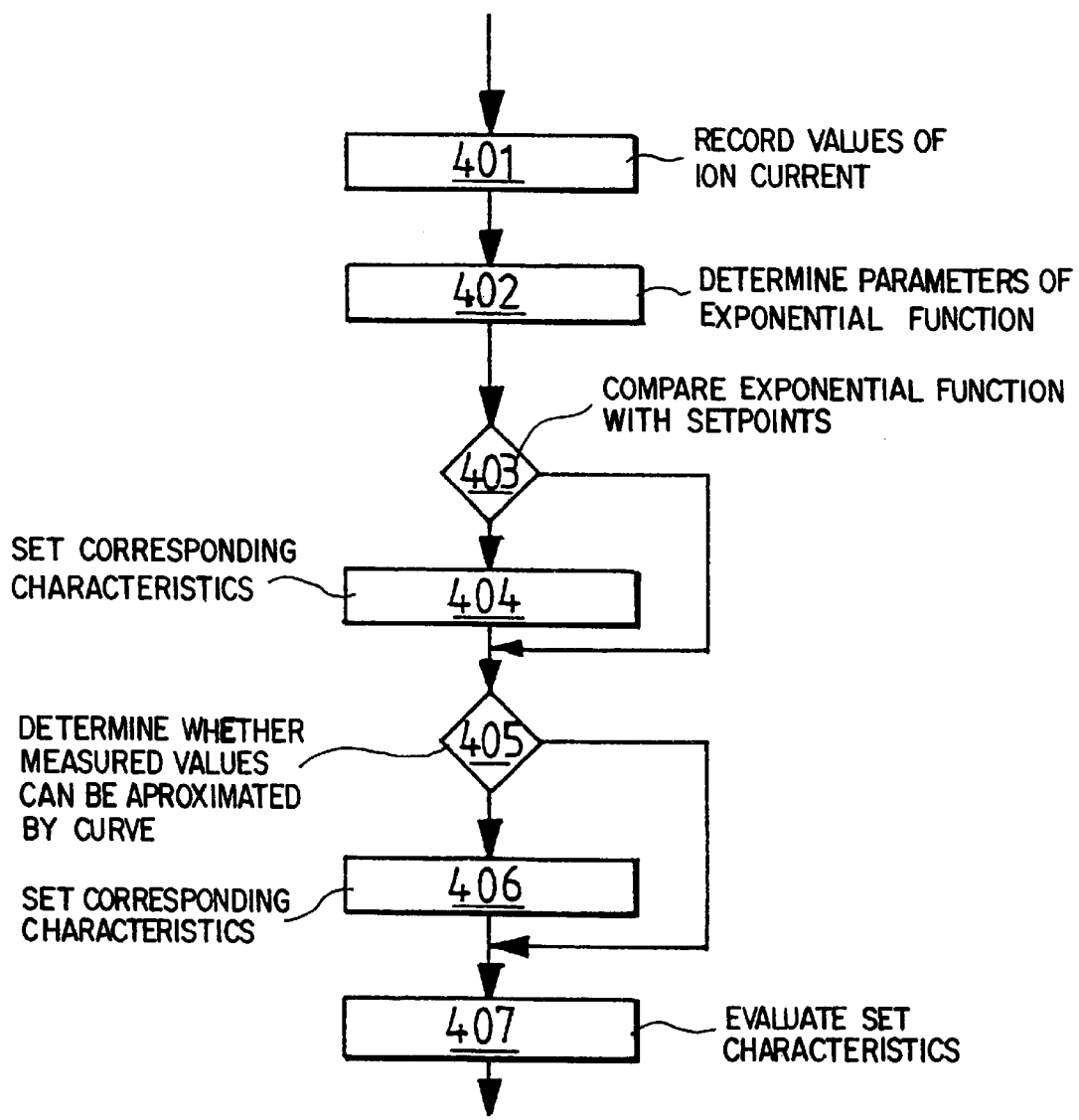

METHOD FOR EVALUATING AN ION CURRENT SIGNAL OF A SELF-IGNITING INTERNAL COMBUSTION ENGINE

BACKGROUND AND SUMMARY OF THE INVENTION

This application claims the priority of German Application No. 198 38 222.7, filed Aug. 22, 1998, the disclosure of which is expressly incorporated by reference herein.

The present invention relates to a method for evaluating an ion current signal of a self-igniting internal combustion engine.

A method is already known for evaluating an ion current signal of a self-igniting internal combustion engine (WO 86/00961), with a measured ion current signal being integrated to determine the carbon content, for example. The rpm can be determined from the spacing of the measurement signals with time.

The goal of the present invention is to expand the evaluation capabilities of an ion current signal.

This goal is achieved according to the invention by a method for evaluating an ion current signal of a self-igniting internal combustion engine, characterized in that a local maximum in the curve of the ion current signal relative to an injection point in time in the ignition shift can be derived from time shift.

The ion current signal can be appropriately windowed in order to be able to detect local maxima during signal evaluation. With this method, the ignition shift both during preinjection and during main injection can be detected.

In a further method according to the invention, the parameters of the main injection can be controlled as a function of an evaluation of the measured ion current following a preinjection.

When controlling the parameters of a main injection on the basis of a measured ion current of the previous main injection, it can happen that a main injection takes place with a fuel volume that is not optimal or with an injection point in time that is not optimal. These parameters cannot be corrected until the next main injection. Advantageously, in this method according to the invention, the main injection can be corrected prematurely, immediately after evaluation of the preinjection and a parameter possibly recognized as not being optimal.

Such a parameter can be, for example, the reacted preinjection volume. For example, the pre-mixed components of the main injection can be controlled.

In the inventive method, there is also an adaptation of the parameters of the main injection as a function of the measured ion current after at least one previous main injection.

This method describes a procedure in which, during evaluation, the measured ion currents of previous main injections are jointly evaluated with appropriate weighting with the measured ion current following a preinjection.

In a further method according to the invention, a carbon determination is performed by an evaluation of the time curve of the ion current signal following an injection.

It has been found that comparatively accurate carbon determination is possible with an evaluation of the time curve on the ion current signal.

In the method according to the invention, the evaluation advantageously takes place with the time curve being approximated by determining the parameters of an e-function that falls with time.

By determining these parameters, a carbon determination can be performed at comparatively low expense during evaluation. The parameters can be determined, for example, using the methods known from parameter identification in control technology.

In the method according to the invention, excessive carbon formation is advantageously detected when at least one of the parameters differs from a previous setpoint by more than a certain amount.

In the method according to the invention, excessive carbon buildup is advantageously detected when, during the determination of the deviations of the measurement points from the curve produced by the parameters, an error is found in the determination of at least one parameter that is larger than a certain value.

In determining the parameters, they are calculated from the measurement points. Because of the number of measurement points, a system of equations is obtained. The parameters are then determined in such fashion that a curve is produced to which the measurement points fit as optimally as possible. In the case of the parameter identification mentioned above, the parameters are determined, for example, by the least squares technique. This provides an indication of how well the measurement points are represented by the curve. When the error becomes too great, it is clear that no parameters can be determined logically any longer.

In the present application, it turns out that the measurement points of the ion current with excessive carbon formation no longer can be logically approximated by an e-function. In determining parameters by means of parameter identification, this can be detected for example by the least squares method. When the error exceeds a certain values, excess carbon formation can be detected.

In a further method according to the invention, continuous injection is detected in a cylinder with the ion current signal being integrated and evaluated in terms of area and/or with the position and/or height of the maximum of the ion current signal being evaluated.

During continuous injection, it turns out that the area below the ion current signal increases. In addition, it develops that the maxima of the ion current signal shifts and change their heights. Advantageously, therefore, such a continuous injection can be detected using the method wherein depending on an evaluation of the measured ion current following a preinjection, the parameters of the main injection can be controlled.

The use of this method proves to be especially advantageous in a vehicle with a self-igniting internal combustion engine, in which the fuel is supplied to the individual cylinders. The fuel is kept in a pressure reservoir. This pressure reservoir is connectable by valves with the individual cylinders. Such systems are known as common-rail systems. If one of these valves sticks in the open position, fuel is fed continuously to that cylinder. Advantageously, this can also be detected by the method according to the invention, wherein continuous injection in a cylinder is detected when the ion current signal is integrated and evaluated in terms of area and/or when the position and/or height of the maximum of the ion current signal are evaluated.

In addition, the ion current signal can also be evaluated as to whether the area below the curve is smaller than a certain threshold value. In this case, it can be concluded that no fuel is being supplied.

In the method according to the invention, injection is advantageously suppressed at least into the cylinder in which continuous injection is detected.

As a result, destruction of the internal combustion engine can advantageously be prevented. It may be advantageous to shut off more than one cylinder to improve the operating smoothness of the engine.

Other objects, advantages and novel features of the present invention will become apparent from the following detailed description of the invention when considered in conjunction with the accompanying drawings.

BRIEF DESCRIPTION OF THE DRAWINGS

FIGS. 2–5 are flow charts of the various embodiments of methods for evaluating the measured ion current signal described herein in accordance with the invention.

DETAILED DESCRIPTION OF THE DRAWINGS

Figure 1:
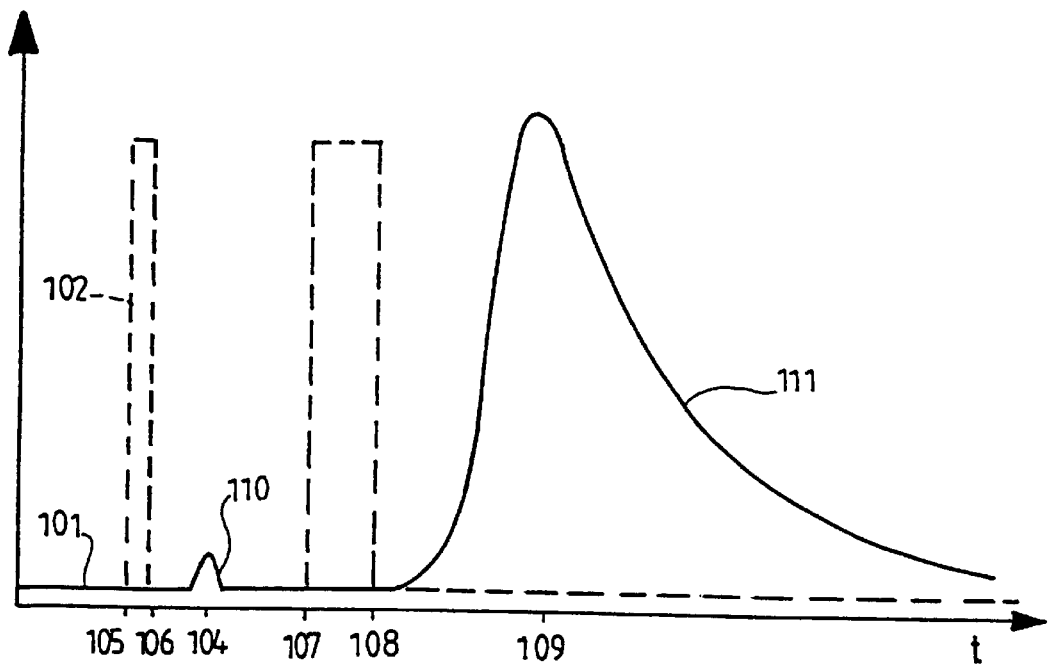
FIG. 1 graphically illustrates the time curve of an ion current signal and an injection signal.

FIG. 1 shows the time curve of an ion current signal 101 plotted as a solid line and an injection signal 102 plotted as a dashed line. It is evident that following an injection with a certain time delay, the maximum ion current signal appears.

Figure 2:
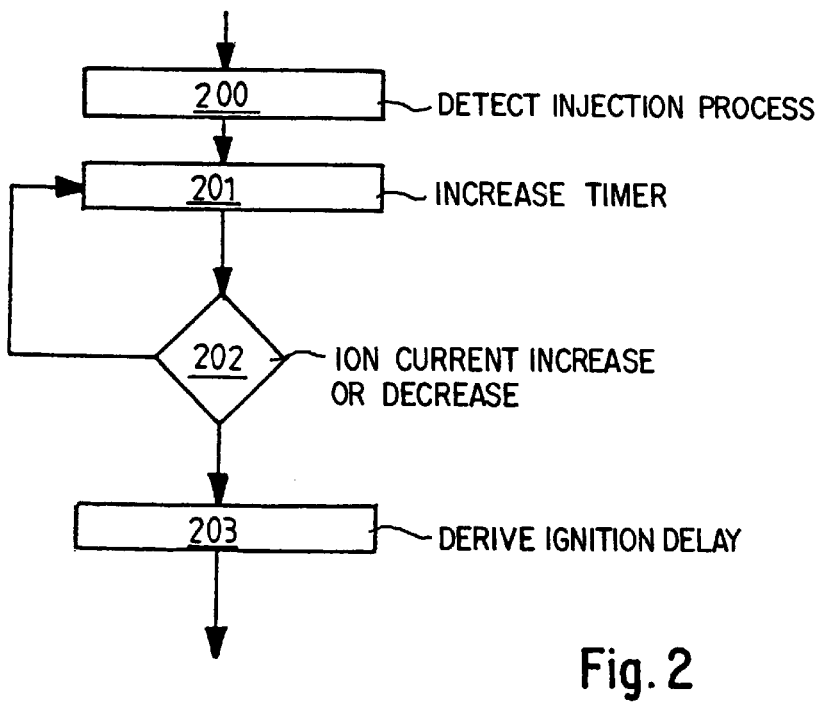

Referring to FIG. 2, the method of the invention is described, wherein a timer is started in step 200 when the beginning of an injection process is detected. In the drawing in FIG. 1, this corresponds to point in time 105 for preinjection and point in time 107 for the main injection.

In step 201, the timer is increased.

In step 202, a check is then made to determine whether the measured ion current 101 is decreasing or continuing to increase. This can occur, for example, when a recorded measured value is compared directly with a previously recorded measured value. This check, however, can also be performed using a suitable averaging process with a plurality of measured values being combined in order to avoid misinterpretation due to individual erroneous values in the measured values.

When it is detected in step 202 that the ion current is continuing to increase, a transition is made to step 201 in which the timer continues to be increased.

If it is detected in step 202 that the ion current is decreasing, a transition is made to step 203 in which, on the basis of the determined value of the timer, the ignition delay is derived from the time difference between the beginning of the injection process 105, 107 and the established local maximum of the ion current signal 101.

FIG. 3 shows another embodiment of a method according to the invention in which the measured ion current following a preinjection 105 is evaluated in a step 301.

Depending on the evaluation of the measured ion current following preinjection, according to step 302, the parameters of the main injection can be controlled. This applies in particular to the injection volume and injection point in time 107. It is also possible in step 302 to take into account the evaluation of measured ion currents following previous main injections in order to adapt the parameters of the main injection.

FIG. 4 shows a method in which a carbon determination is performed from the time curve of the ion current signal 101 following an injection.

Advantageously, for this purpose, in step 401, measured values of the ion current are recorded after the local maximum has been reached up until the exhaust valve opens.

In step 402 the parameters of an exponential function are determined for the recorded measured values, using the parameter identification method for example. The parameters of the e-function are determined so that with the measured values relative to the curve obtained from the parameters, the squares of the differences between the measured values and the curve are minimized. These squared differences are thus a measure of how well the measured values can be approximated by an e-function.

In step 403, the determined parameters of the e-function are compared with previous setpoints. If the determined parameters vary by more than a certain amount from the associated setpoints, a transition is made to step 404, in which a corresponding characteristic is set. If the determined parameters vary by no more than a certain amount from the corresponding setpoints, a transition is made to step 405.

In step 405, a check is made to determine whether the measured values can be sufficiently well approximated by the curve that results from the determined parameters. It has been found that during carbon formation, the measurement curve of the measured ion current differs from the behavior of an exponential function. In the determination of the parameters of the e-function using the method of parameter identification, this can be detected when the squares of the differences are evaluated. If the squares of the differences determined increase, in other words when the error during determination is larger than a certain value, a transition is made to step 406 in which a corresponding characteristic is set. Otherwise, a transition is made to step 407.

In step 407, an evaluation is conducted of the characteristic possibly set in steps 404 and/or 406. It is evident that only one of the checks of steps 403 or 405 can be performed.

Excessive carbon formation can then be detected in step 407. The degree of carbon formation may also be detected.

To detect carbon formation it is also possible in addition to, or instead of, the evaluation described earlier, to evaluate the position and height of the signal maximum based on the injection point in time.

Figure 5:
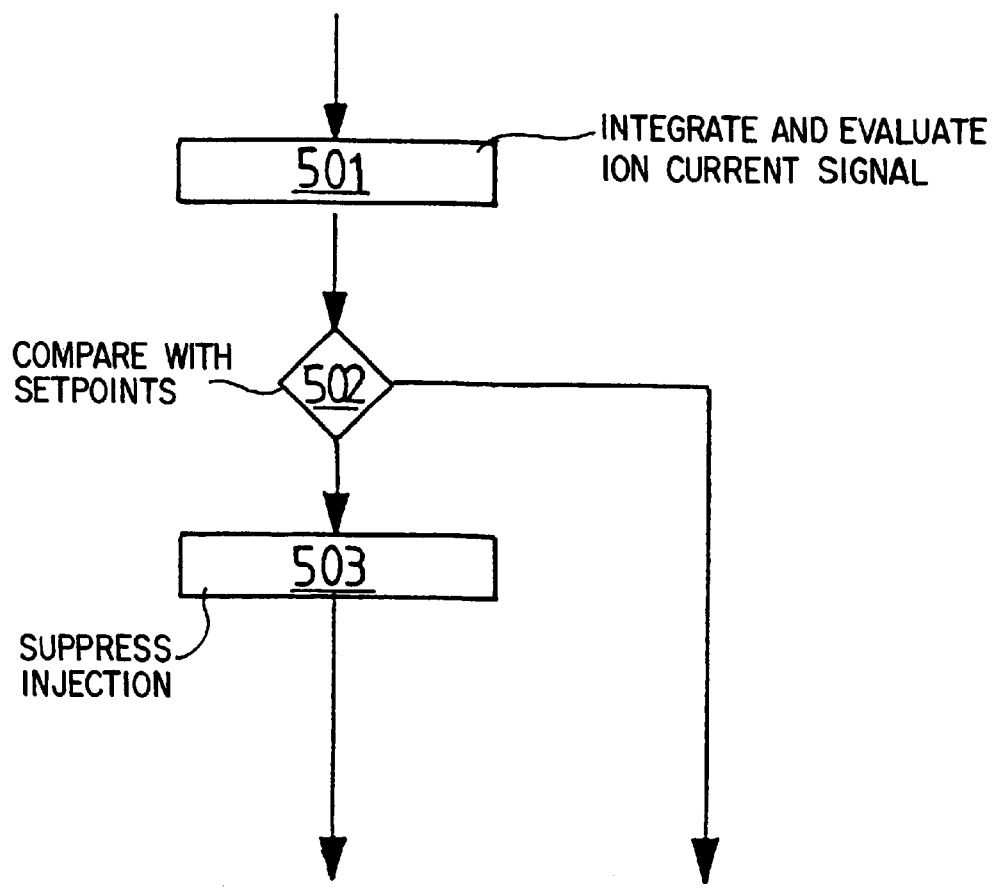

In the diagram in FIG. 5, in step 501 the ion current signal 101 is integrated and evaluated in terms of area, and/or the position and/or height of the maximum of the ion current signal are evaluated. Following this evaluation, at least one of these values is compared in step 502 with one or more setpoints. In particular, when the heights of the maxima exceed certain threshold values or the areas below the curves exceed certain thresholds, continuous injection in at least one cylinder is detected.

When continuous injection is detected in step 502, a transition is made to step 503, in which injection is suppressed in at least those cylinders in which a malfunction has been detected.

By evaluating the corresponding values, for example, it can also be determined when there is no injection at all into individual cylinders.

The embodiment of the method according to the invention, wherein evaluation takes place while the time curve is being approximated by determination of the parameters of an e-function that falls with time, is especially advantageous in diesel engines whose energy supply is provided by the individual cylinders being connected with a pressure reservoir during an injection process. Such systems are known as common-rail systems. If a valve sticks in such a system, continuous injection and possible damage to the internal combustion engine can advantageously be suppressed by this method.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method for evaluating a self-igniting internal combustion engine, the method comprising the acts of:

determining an ion current signal of the self-igniting internal combustion engine; and deriving an ignition shift of the engine as a function of a time difference between a local maximum in a curve of the ion current signal and an injection point in time.

2. A method for evaluating a self-igniting internal combustion, the method comprising the acts of:

measuring an ion current signal of the self-igniting internal combustion engine; and controlling parameters of a main injection depending upon an evaluation of the measured ion current signal following a preinjection.

3. The method according to claim 2, wherein the parameters of the main injection are adapted as a function of the measured ion current signal of at least one previous main injection.

4. A method for evaluating a self-igniting internal combustion, the method comprising the acts of:

determining an ion current signal of the self-igniting internal combustion engine; and performing a carbon determination as a function of a time curve of the determined ion current signal subsequent to a time of an injection point.

5. The method according to claim 4, wherein the time curve is approximated by determination of parameters of an e-function decreasing with time.

6. The method according to claim 5, further comprising the act of detecting excessive carbon formation when at least one of the parameters deviates by more than a defined amount from a specified setpoint.

7. The method according to claim 5, further comprising the act of:

during a determination of deviations of measurement points from the time curve resulting from the parameters, detecting excessive carbon formation when an error in the determination of at least one parameter is greater than a defined value.

8. The method according to claim 6, wherein during the determination of the deviations of the measurement points from the time curve resulting from the parameters, excessive carbon formation is detected when an error in the determination of at least one parameter is greater than a defined value.

9. A method for evaluating an internal-combustion engine, the method comprising the acts of:

determining an ion current signal of the self-igniting internal combustion engine; and detecting continuous injection in a cylinder of the engine based on results of at least one of an integration and evaluation of the ion current signal in terms of area, and an evaluation of at least one of a position and height of a maximum of the ion current signal.

10. The method according to claim 9, further comprising the act of suppressing injection in at least those cylinders of the engine in which continuous injection is detected.

* * * * *